Oct. 26, 1926. Re. 16,446

E. SCHUFFTAN

METHOD AND APPARATUS FOR MAKING COMPOSITE MOTION PICTURES

Original Filed Sept. 15, 1923 3 Sheets-Sheet 1

Inventor
Eugen Schufftan

PHOTO-LITHO by SACKETT & WILHELMS CORP. N.Y.

Oct. 26, 1926. Re. 16,446

E. SCHUFFTAN

METHOD AND APPARATUS FOR MAKING COMPOSITE MOTION PICTURES

Original Filed Sept. 15, 1923 3 Sheets-Sheet 2

Inventor
Eugen Schufftan

Oct. 26, 1926. Re. 16,446

E. SCHUFFTAN

METHOD AND APPARATUS FOR MAKING COMPOSITE MOTION PICTURES

Original Filed Sept. 15, 1923 3 Sheets-Sheet 3

Inventor
Eugen Schufftan

Reissued Oct. 26, 1926. Re. 16,446

UNITED STATES PATENT OFFICE.

EUGEN SCHÜFFTAN, OF WASHINGTON, DISTRICT OF COLUMBIA.

METHOD AND APPARATUS FOR MAKING COMPOSITE MOTION PICTURES.

Original No. 1,569,789, dated January 12, 1926, Serial No. 663,011, filed September 15, 1923. Application for reissue filed September 16, 1926. Serial No. 135,969.

This invention refers broadly to means of producing composite cinematographic or moving pictures, and it is particularly intended to improve the reproduction of movable objects or persons on a substantially immovable back-ground. As heretofore practiced it has been usual in the taking of pictures for cinematographic purposes to build up and compose the object with the entire scenery in their natural shape and sizes. It has, however, been suggested to place the back ground on a reduced scale in front of the fore-ground, but by this procedure portions of the actual fore-ground or of the personages acting upon it are very likely to be covered up by the back ground which has been placed in front during the taking of the picture. In order to overcome this inconvenience, I proceed according to my invention by reproducing only a portion of the scenery on which the acting personages are moving, in its natural shape, form and size; this portion of the object being reproduced by a mirror, the outlines of which exactly correspond to the shape and size of the object on a reduced scale, while the supplemental object is arranged at the rear of the mirror and on a reduced scale in such a manner that it will reproduce the total object, when combined with the image shown by the mirror. By this means the proper sequence of elements, the apparatus, fore-ground and back ground, is always insured, inasmuch as the mirror with correspondingly reduced fore-ground has been disposed in front of the reduced back ground. In view of this arrangement the total object is made to contract at a certain point into the total picture with the assistance of the mirrors.

I may also make use of a plurality of mirrors which, whenever required, are mounted on special shutters or upon the model on a reduced scale, so that several personages acting at different points may be combined into a composite total picture. Instead of the reduced model I may also make use of a picture or of a projected image disposed at the same point.

This invention will be further described with reference to the accompanying drawings showing several preferred means of carrying the invention into practice by way of example.

Figure 1:
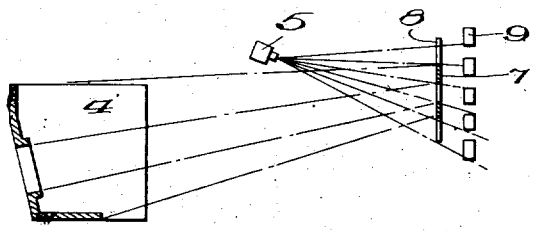
Figure 1 shows more or less diagrammatically an arrangement for carrying out my invention.

Referring more particularly to Figure 1, an object, set or scene of full size is reproduced by means of a mirror and by the camera 5. This mirror, indicated at 7, is so constructed that it will reflect only portions of the object 4 which may be required for moving pictures while an object 9 located at the rear of the mirror 7 will be visible from the direction of the camera through transparent portion 8 coordinated with the mirror 7 so that the model 9 may be directly photographed by the camera. The set or scene shown at 4 represents a complemental portion of the model 9 so that when the two images formed in the camera are fitted together they will form a composite image of a complete scene which is desired for a special picture.

The construction of the mirror 7 and the transparent member 8 assumes in a particular form a transparent member such as glass or any other light transmitting medium on the surface of which, which faces the set 4, is formed a reflecting surface or mirror. By the use of a mirror mounted on a face of a transparent or light transmitting member 8 having a greater surface area than the mirror 7 so that the transparent member extends beyond the periphery of the mirror, the image of the model 9 photographed directly through the transparent member and the reflected image of the complemental full sized set or scene 4 will have their meeting edges blended into each other by the coordination of the mirror and the light transmitting member 8. The mirror, as will be appreciated from an inspection of the drawing, acts as a mask for preventing light rays entering the camera from that portion of the model 9 which is represented by the complemental set 4.

Figure 2:
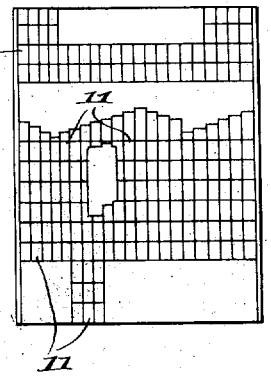
Figure 2 is a front elevation of one form of mirror adapted for indirect taking of the pictures.
Figure 3:
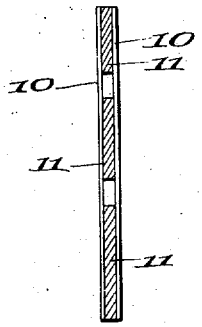
Figure 3 is a transverse vertical section of the mirror shown in Figure 2.

The form of construction of the mirror shown in Figures 2 and 3 discloses two transparent glass plates 10 between which a mirror composed of small fractional parts 11 may be arranged to correspond exactly to the image in the mirror of the natural object.

Figure 4:
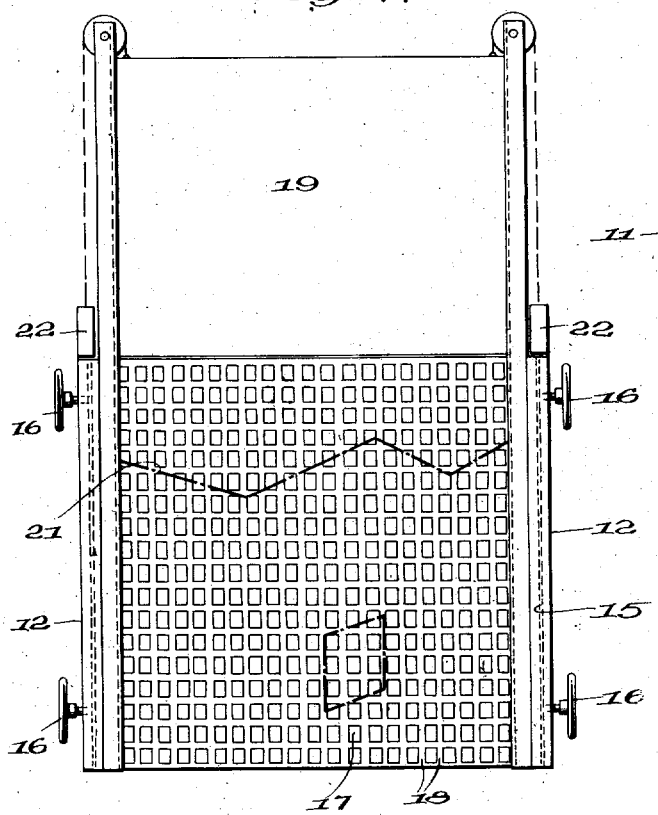
Figure 4 is a view in elevation of a modified form of a mirror having means for increasing the reflecting surface of an apparatus.
Figure 5:
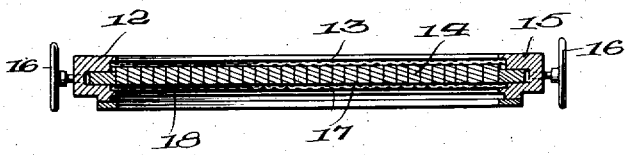
Figure 5 is a transverse section of the mirror shown in Figure 4.
Figure 6:
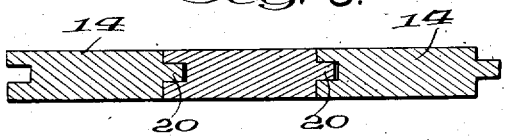
Figure 6 is a section showing the construction of the mirror in Figure 4.

In the form of construction shown in Figures 4 to 6 inclusive the mirror comprises a frame 12 closed at the back by a transparent glass plate 13. Upon said plate 13 a mirror 14 is mounted which is composed of small single fractions or tongues and which is maintained in position by two bars 15 and screws 16 so that the reflecting side is on the outer surface. In front of this divisional mirror, a glass plate 17 is arranged which is provided upon its inner surface confronting the mirror, with a reflecting coating 18 similar to a grating. The line 21 and the other line of demarcation in Figure 4 correspond to the outlines of the full sized set 4 which outlines are also to be simulated by the shape of the mirrors 7 and 14.

By releasing the screw 16 the sections of the mirror may be displaced in such a manner as to correspond to the outlines of the object to be produced. In place of a mirror composed of small individual sections, any other surface of different material may be arranged behind the grating and said surface being either carried by individual sections, or, still more advantageously, a mirror formed on a transparent member may have a portion removed to provide a transparent section with the remaining reflecting surface conforming substantially to the outlines of the full sized set 4 and operating as a mask for the complemental portion of the model 9.

In picturing the action, it is, however, of frequent occurrence that the acting personages may be moving very much in the foreground so that in the visual line such person or persons protrude beyond the outlines of the image of the set or scene 4 and therefore is prevented from completely appearing in the image reflected by the mirror in consequence thereof. In such case, the operator places in front of mirror 14 or 17 an additional mirror 19 corresponding to the entire full size of the picture and balanced by weights 22 so that the acting person may be fully reproduced. It becomes necessary, however, that in this case the background of the natural object or set 4 is maintained perfectly black. When the actor steps back within the outlines of the image of the natural object the mirror 19 is withdrawn. By any suitable means the length of the strip of the film reproduced by the mirror 19 is positively determined and maintained and after the photographing of the film has been completed a strip of film of equal length is made with the supplemental object. The final film is then obtained by superimposing the negatives thus produced for printing in a well known manner.

As shown in Figure 6 the mirror 14 consists of small sections which are guided along each other by tongue and groove formation as indicated at 20.

I also make use of a mirror or reflecting plate which is provided with a reflecting coat only at those points which correspond to the set or scene 4, and a further improvement of the method is accomplished by having the mirror referred to possess both reflecting as well as light transmitting properties, inasmuch as on its outer surface there is such a very thin reflecting coating that the mirror constitutes a transparent disc. This type of mirror is usually designated in the arts as half-transparent or translucent mirrors. Such a mirror is indicated at $7^a$ in Figure 7. An opaque transparent paper or mask 40 is arranged behind this mirror and is of such a size and shape as to exactly correspond to the image of the set or scene 4 which is reflected from the semi-transparent mirror $7^a$ so that the semi-transparent mirror will be opaque at these points and will also act to mask a complemental portion of the model 9. With such a mirror, however, objects that happen to be in the room where the picture is taken are liable to be reflected upon the part of the mirror which remains transparent. In order to obviate this drawback, a shutter 25 is arranged between the set or scene 4 and the mirror $7^a$ and provided with an opening 26 which conforms to the set or scene 4 on the corresponding scale, so that the disturbances in the transparency of the mirror by any possible reflections are avoided.

Figure 8:
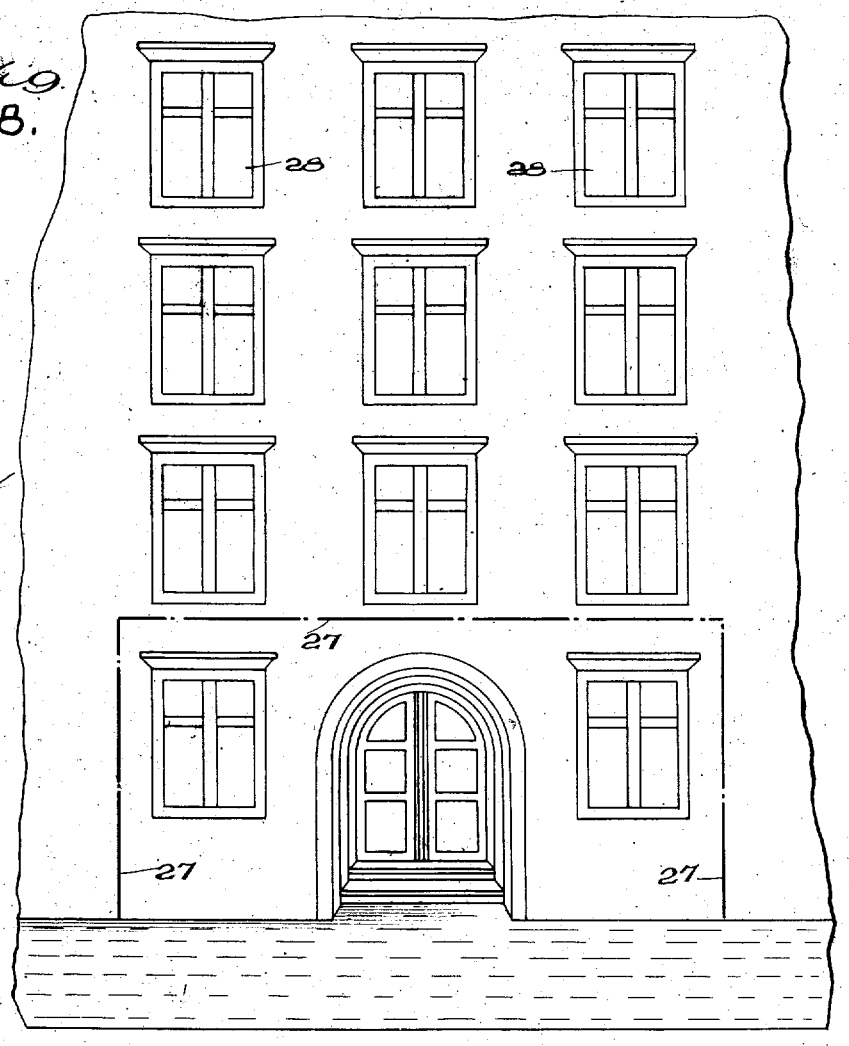
Figure 8 is a view in elevation of the front part of a building having several stories.
Figure 7:
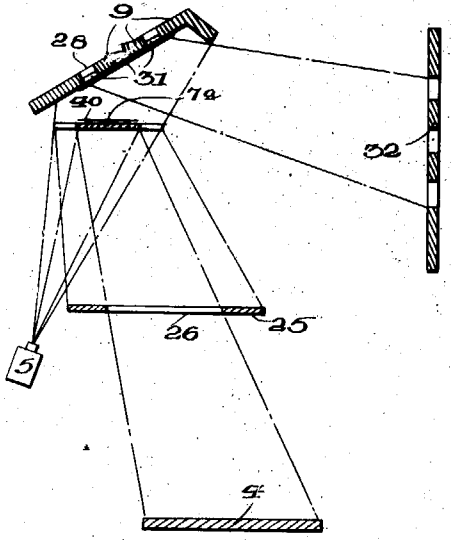
Figure 7 shows more or less diagrammatically a modified form of the arrangement disclosed in Figure 1.

In accordance with Figure 7 the set or scene 4 is reproduced by the camera 5 and by means of the mirror $7^a$ and the cooperating mask 40. Between the mirror $7^a$ and the scene 4 the shutter 25 is arranged with the surface of the shutter confronting the mirror 7 shaped in such a manner as not to interfere with the corresponding portion of the picture and in consequence thereof disturbing reflecting phenomena in the mirror $7^a$ are perfectly avoided. Thus for example, if it be desired to use the front of a building as a total object as shown in Figure 8 only the portion surrounded by the dot-and-dash lines 27 is erected in full natural size and is placed at 4. The remaining complemental portion of the front of the building is disposed as a model 9 behind the mirror 7[a]. In the arrangement shown in Figure 7 a supplemental scene as indicated at 32 is so placed that light rays from said supplemental scene will be reflected by a mirror 31 placed on the model 9 into the camera 5 and since this portion of the model 9 which is covered by the mirror 31 is located above the upper edge of the mask 40 behind the mirror 7[a] the mask 40 will not interfere with the reflection of an image from a supplemental full sized model 32. With the use of mirror 31 persons who appear to be performing at the windows 28 of the third floor may be reproduced by placing several models 32 of natural size at the proper position and angle from the mirror 31. The full sized models 32, for instance, represent windows in natural size and of the same design as the windows in the miniature model 9 so that images of persons appearing in the windows of the model 32 will be reflected into the camera 5 and form with the reflected image from the mirror 7[a] and the direct image from the model 9 a composite image which, when photographed, will give a picture of set or scene 4 with persons acting in front of this portion of the building combined with the picture of complemental portions of the model 9 and of the windows 28 with persons acting in the windows as viewed in the windows of the supplemental model 32.

Figure 9:
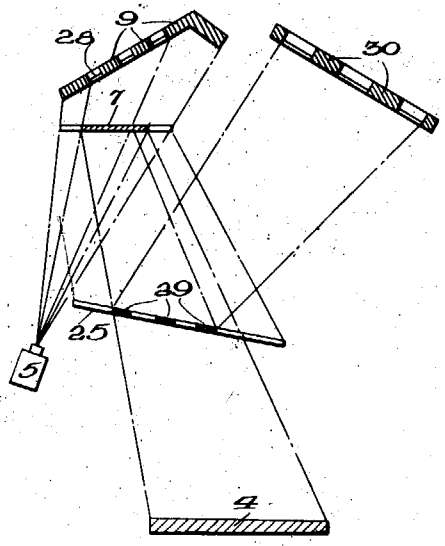
Figure 9 shows more or less diagrammatically a further modification of the arrangement disclosed in Figure 7.

In Figure 9 an arrangement is shown in which the mirror 31 is not employed on the model but mirrors 29 are mounted on the shutter 25 which is specially constructed for the purpose. The mirrors 29 are disposed at the precise points on the shutter 25 so that the mirrors 29 will reflect the image of the windows in the supplemental model 30 onto the mirror 7, the image in turn being formed on a frame or ground glass in the camera 5. The model 30, like the model 32, for instance, may represent a window in natural size and of the same design as the windows in an upper story of the miniature model 9. The advantage in the arrangement shown in Figure 9 over that of Figure 7 is the fact that persons may not only appear within the confines of the windows but they may lean out of a window and their images will be properly formed within the camera 5 while in the construction shown in Figure 7 the persons acting at the windows must at all times maintain all portions of the body within the confines of the window. This is due to the fact that the mirror 31 is formed on the building and will reflect only those portions of the model 32 which correspond to the shape and size of the mirror. In Figure 9, however, the mirrors 29 are placed on the shutter 25 and will reflect all objects or persons appearing about the full sized windows 30 through the cooperation of the mirrors 7 and there provide an image in the camera 5 of the windows and the persons acting in the model as indicated at 30. The shutter 25 must be so positioned that an image of the persons and windows in the model 30 will be produced in the camera 5 by means of the cooperating reflecting surfaces or mirrors 29 and 7. It also must be borne in mind that said image formed in the camera must be so correlated with the real image of the model 9 that persons will appear as acting in the window of the model when the composite image is viewed on a ground glass in the camera 5. It follows as a matter of course in adding the supplemental scene 30 at the proper place in the film that the reflecting surface of the mirror 7 must be increased in Figure 9 in order that the image of scene 30 may be reflected into the camera. This additional reflecting surface also masks the complemental portion of the model 9.

Where a semi-transparent mirror is employed, as has been previously described, a mask is provided for that portion of the semi-transparent mirror which corresponds in shape to the virtual image of the scene 30 as reflected by the mirror for reproduction on a film. The mirror or mirrors which have been placed on the shutter 25 must be so positioned relative to the top of the full sized complemental set or scene 4 that said mirrors will not in any manner interfere with the light rays from said set. The semi-transparent mirror 7[a] is particularly useful where it is desired to reflect only a small portion of a supplemental scene while directly photographing a complemental object, set or scene through the transparent member and in such a case if a large mirror were employed and the mirrored surface were removed except that small portion which is required, the use of a full silvered mirror in such a case would be an unnecessary expense. In this case it is only necessary to employ a large semi-transparent mirror and employ a small mask at the point desired.

In certain cases it is necessary to employ a mirror in connection with a transparent surface for not only blending the images but for reflecting an image of a supplemental scene or complementary portion of a scene with the mirror located close to the camera but far away from the model or set. In this instance the transparent member having a portion of its surface partially mirrored is not practical, due to the fact that the blending by the mirror and the transparent member extends over too great a surface. The semi-transparent mirror in connection with a mask does not, in such a case, cause the blending to extend over too great a surface of the composite image so that the proper blending is had. The blending is caused as will be apparent, from the drawings and the preceding description, by locating the opaque mirror or the masks for the semi-transparent mirrors in the unsharp zone of the light rays from the sets or scenes and in conjunction with the mirrored surface of the transparent member being effective on that face of the transparent member which is opposite the camera.

Figure 10:
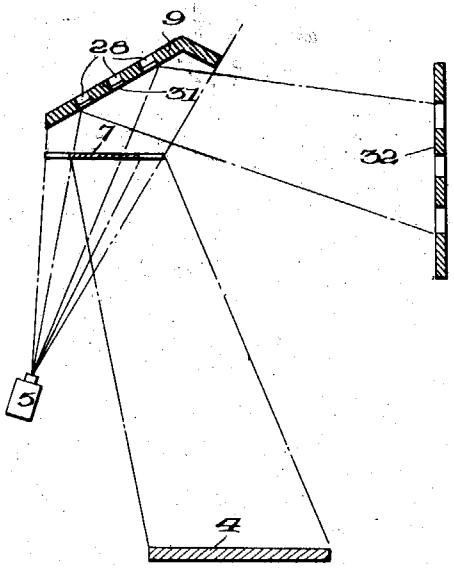
Figure 10 is a diagram of another modified arrangement for taking pictures according to the principles of my invention.

Figure 10 has a similar arrangement to that shown in Figure 7 except that the shutter 25 is omitted. This is due to the fact that a transparent member is employed in this case as shown at 7 with only a portion of its surface provided with a reflecting surface, while in Figure 7 a shutter 25 is used in connection with a semi-transparent mirror $7^a$ to prevent reflecting phenomena from the semi-transparent portions of the mirror which extends beyond the mask 40. This shutter presents another possibility for the taking of pictures thus, for instance, in the case of the acting personages having to perform their parts at different levels, in which case according to my invention, such persons are enabled to perform their parts upon level ground and without the necessity of erecting expensive structures. The shutter for this purpose contains adjustable mirrors by means of which single actions may be transferred from a point of action on level ground to the corresponding points of the actual object. The said adjustable mirrors may also be inserted into the cone or vision of the apparatus at other points either between the main mirror and the apparatus or behind the main mirror in the model. In this case the persons performing upon a separate place may be pictured in the model through the transparent main mirror.

In either case, whether an opaque mirror is provided on that face of the transparent member which is opposite the camera or whether a semi-transparent mirror is employed in connection with masks a sight window is formed for a direct taking of one of the sets or scenes by removing a portion of the opaque mirror which will be proportionate in area to that portion of the light cone from the set or scene at that point where the light cone passes through the sight window. It the case of the semi-transparent mirror a portion of the mask is removed in a manner similar to the removal of a section of the opaque mirror to provide a sight window for a direct taking of the set or scene which is in direct line with the camera. In the first instance, the oqaque mirror not only acts as a mask for the complemental set or scene but provides means for reflecting an image of the complemental set or scene into a camera. The mask in connection with the semi-transparent mirror not only acts to mask a portion of the set or scene which is directly photographed but provides for a reflecting surface whereby the complementary set or scene is photographed by reflection.

In the procedure just described the model is always bodily represented on a reduced scale. This kind of model is frequently insufficiently defined or not sufficiently extensive in cases, for instance, where classical buildings are to be reproduced, or in case a moving land-scape is to be shown in the supplemental combination object. In such cases the stereometric or three-dimensional representation of the model may be preferably replaced by a planimetric or pictural representation thereof, in a manner described in my divisional application for patent, filed September 5, 1925, Serial No. 54,731.

By the combined use of natural, that is to say, three-dimensional objects of full size and of planimetric complemental representations and with or without additional models of preferably reduced size a great variety of composite pictures may be obtained in further pursuance of my invention, and by the use of reflecting surfaces, substantially conforming to the outlines of one of the objects, preferably the three dimensional objects special precautions being taken to obtain a perfect fitting together and merging of the different sectional pictures obtained, such means being more fully described in connection with the use of masks or silhouettes in my divisional application for patent, filed September 5, 1925, Serial No. 54,732.

In the description and in the claims, wherever the words "set or scene" are employed it is intended to designate a reality, or life sized scene or some such miniature reproduction as a photograph, a model, a diapositive, a projection or a painting.

While I have shown the set or scene 9 as a miniature reproduction disposed in direct line with the camera so that the set or scene may be photographed directly through the window in the transparent member, it will be appreciated that without the exercise of invention the miniature reproduction may be photographed by reflection.

This invention has been described and shown in its broad aspects only, and it should be understood that it is capable of such modifications and alterations as will better adapt it to existing conditions, and to the convenience of the user and without deviating from the spirit of the invention.

It will be appreciated that with the system described that the photographing of the plurality of sets or scenes may be done simultaneously or at different times as may be required and in either case the edges of the images will be blended into each other.

What I claim is:

1. The art of making composite motion pictures of a set or scene and a second set or scene which is complementary to the first set or scene, which comprises arranging a light transmitting member between the first set or scene and a camera, forming an image of a portion of one of the sets or scenes on a frame of the camera, forming an image on the same frame of the complementary set or scene with a reflecting surface on the light transmitting member, said light transmitting member extending beyond the reflecting surface for blending the adjacent edges of the two images into each other by the coordination of the reflecting surface and the transparent member.

2. The art of making composite motion pictures of a plurality of sets or scenes, which comprises disposing one of the sets or scenes within range of a camera, masking a portion of said set or scene with a reflecting surface on a light transmitting member, portions of such member extending beyond the edges of the reflecting surface, producing on the reflecting surface an image of another set or scene, and photographing the unmasked portion of the first mentioned set or scene through the light transmitting member and at the same time the reflected image of the second set or scene, the meeting edges of the light transmitting member and the reflecting surface cooperating to blend the meeting edges of the images of the sets or scenes.

3. The art of making composite motion pictures of a set or scene and a second set or scene complementary to the first set or scene which comprises disposing the first set or scene within range of a camera, masking a portion of said first set or scene with a reflecting surface, producing on the reflecting surface within range of the camera an image of the complementary set or scene and blending the meeting edges of the composite image formed in the camera by coordinating a light transmitting member along the periphery of the reflecting surface where the two images of the first and complementary sets or scenes are fitted together.

4. The art of making composite motion pictures of a set or scene and a second set or scene complementary to the first set or scene, which comprises disposing the first set or scene within range of a camera, masking a portion of said first set or scene with a reflecting surface, producing on the reflecting surface within range of the camera an image of the complementary set or scene, and blending the meeting edges of the composite image formed in the camera by coordinating a light transmitting member along the periphery of the reflecting surface where the two images of the first and complementary sets or scenes are fitted together, photographing the unmasked portion of the first set or scene and the image reflected by the reflecting surface.

5. The art of making composite motion pictures of a set or scene and a second set or scene complementary to the first set or scene which comprises disposing the first set or scene within range of a camera, masking a portion of the first set or scene with a reflecting surface, producing on the reflecting surface within range of the camera an image of the complementary set or scene, blending the edges of the two images formed in the camera by a light transmitting member coordinated with the reflecting surface, increasing the reflecting surface to include in the image moving objects which have passed beyond the range of the original reflecting surface, and then photographing the composite image formed in the camera.

6. The art of making composite motion pictures of a set or scene, and a second set or scene complementary to the first set or scene, which comprises disposing the first set or scene within range of a camera, masking a portion of the first set or scene with a reflecting surface, producing on the reflecting surface within range of the camera an image of the complementary set or scene, blending the edges of the two images formed in the camera by a light transmitting member coordinated with the reflecting surface, photographing the composite image formed in the camera and increasing the reflecting surface between successive acts of photography to include in the image moving objects which have passed beyond the range of the original reflecting surface.

7. The art of making composite motion pictures of a set or scene, and a second set complementary to the first set or scene which comprises disposing the first set or scene within range of a camera, masking a portion of the first set or scene with a reflecting surface, producing on the reflecting surface within range of the camera, an image of the complementary set or scene, photographing the composite image formed in the camera, and increasing the reflecting surface between successive acts of photography to include in the image moving objects which have passed beyond the range of the original reflecting surface.

8. The art of making composite motion pictures of a set or scene, and a second set or scene complementary to the first set or scene, which comprises disposing the first set or scene within range of a camera, arranging a member having light transmitting qualities between the camera and the first set or scene, masking a portion of the light transmitting member which lies in the path of the light rays from said first set or scene while providing for a reflecting surface on the masked portion of the light transmitting member, photographing the unmasked portion of the set or scene directly through the unmasked part of the member having light transmitting qualities and photographing an image of the complementary set or scene reflected by the masked portion of the light transmitting member, and blending the meeting edges of the images formed in the camera by the action of the light rays along the coordinated edges of the member having light transmitting qualities and the masking element.

9. The art of making composite motion pictures of a set or scene, and a second set or scene complementary to the first set or scene which comprises disposing the first set or scene within range of a camera, arranging a light transmitting member having a reflecting portion between the camera and the first set or scene, masking a portion of said first set or scene by the reflecting portion of said light transmitting member, forming an image of the unmasked portion of the set or scene on a frame in a camera, and at the same time forming on the same frame an image of the complementary set or scene by the reflecting portion of said transparent member, the meeting edges of the images being blended by the action of light along the coordinated edges of the light transmitting member and the reflecting portion thereof.

10. The art of making composite motion pictures of a set or scene and a complementary set or scene which comprises disposing the first set or scene within range of a camera, masking the first set or scene with a reflecting surface on a transparent member, removing an irregular section of the reflecting surface to provide a sight window in the transparent member through which the first set or scene may be photographed, forming an image of the unmasked portion of the first set or scene on a frame in the camera, forming an image of the complementary set or scene on the same frame with the unremoved portion of the reflecting surface on said transparent member.

11. The art of making composite motion pictures of a set or scene and a complementary set or scene, which comprises disposing the complementary set or scene in front of a mirror carried by a transparent member which extends beyond the periphery of the mirror, positioning the first set or scene at the rear of the mirror, producing on a frame in a camera an image directly from the first set or scene, and at the same time producing on the same frame an image of the complementary set or scene by reflection from the mirror, the adjacent edges of the images being blended by the action of light along the coordinated edges of the mirror and the transparent member.

12. An arrangement for use in taking composite motion pictures comprising a set or scene, a complementary set or scene, a camera, and a transparent member having a mirror on a portion of its surface located between the first mentioned set or scene and the camera and disposed at such an angle that an image of the complementary set or scene will be reflected into the camera, a portion of the first mentioned set or scene being visible through the transparent member so that that portion of the first mentioned set or scene which appears beyond the confines of the mirror may be directly photographed by the camera.

13. An arrangement for use in taking composite motion pictures comprising a set or scene, a complementary set or scene, a camera, a light transmitting member located between the first mentioned set or scene and the camera, a mirror on that face of the light transmitting member which faces the camera and having a less area than the light transmitting member, the mirror and the light transmitting member being disposed at an angle to the axis of the camera so that the reflection of an image of the complementary portion will be directed into the camera for photographing with that portion of the first mentioned set or scene which is visible through the transparent member, the transparent member and the mirror at points adjacent their meeting edges cooperating to blend the meeting edges of the images formed in the camera.

14. The art of making composite motion pictures of a set or scene and a complementary set or scene, which comprises disposing the first set or scene within range of a camera, masking a portion of said set or scene with a reflecting surface mounted on a transparent member having a greater area than the reflecting surface so that the transparent member will extend beyond the periphery of said reflecting surface, producing on the reflecting surface an image of the complementary set or scene, and photographing the unmasked portion of the first set or scene and the reflected image on a single frame in the camera, the transparent member and reflecting surface cooperating to blend the meeting edges of the images formed on the frame in the camera.

15. An arrangement for producing composite motion pictures comprising a plurality of sets or scenes, a camera, a transparent member disposed across the path of the light rays from the sets or scenes and having a reflecting surface so arranged upon a portion of the transparent member as to provide in the transparent member a sight window through which one of the sets or scenes may be photographed, the transparent member and reflecting surface being disposed in front of the camera and at an angle to the axis of the camera and at an angle to the light rays from the other set or scene that a portion of the other set or scene may be photographed by reflection, said transparent member and reflecting surface being disposed in the unsharp zone of the light rays from the sets or scenes.

16. An arrangement for producing composite motion pictures of a plurality of sets or scenes comprising a camera, a transparent member, a reflecting surface on the transparent member and having a portion of the reflecting surface thereof removed to provide a sight window through the transparent member for a direct taking of one of the sets or scenes, said transparent member being located between the last mentioned set or scene and the camera and positioned at an angle to the axis of the camera and relative to the other set or scene that a portion of the other set or scene may be photographed through the window in the transparent member, while a complementary portion of the other set or scene may be photographed by reflection, the reflecting surface being located in the unsharp zone of the light rays from the sets or scenes.

17. An arrangement for producing composite motion pictures comprising a plurality of sets or scenes, a camera, a transparent member disposed in front of the camera and across the light rays of the sets or scenes, a mask associated with a portion of the transparent member and providing for a window in the transparent member through which one of the sets or scenes may be photographed and also for a reflecting surface, the transparent member and reflecting surface being positioned at an angle to the axis of the camera and relative to the other set or scene that the other set or scene may be photographed by reflection, said mask being located in the unsharp zone of the light rays from the sets or scenes.

18. An arrangement for producing composite motion pictures comprising a plurality of sets or scenes, a camera, a transparent member located between one of the sets or scenes and the camera and across the light rays from the sets or scenes, a reflecting surface on the transparent member and having a portion of the reflecting surface thereof removed to provide a sight window through the transparent member for a direct taking of the first mentioned set or scene, said transparent member and reflecting surface being located at an angle to the light rays of the sets or scenes that a portion of the other set or scene may be photographed by reflection, said reflecting surface being located in the unsharp zone of the light rays from the sets or scenes.

19. An arrangement for producing composite motion pictures comprising a plurality of sets or scenes, a camera, a transparent member disposed between one of the sets or scenes and the camera, a mask associated with a portion of the transparent member, providing for a window in the transparent member through which the first mentioned set or scene may be photographed, and also for a reflecting surface, the transparent member and reflecting surface being positioned at an angle to the axis of the camera and at an angle to the light rays from a second set or scene that the second set or scene may be photographed by reflection, a second mirror being disposed in the path of the light rays from one of the first mentioned sets or scenes and at an angle to the light rays from a third set or scene that a portion of one of the first mentioned sets or scenes will be masked while an image of the third set or scene will be reflected into the camera and form with the images of the other two sets or scenes a composite picture.

20. The art of making composite motion pictures of a plurality of sets or scenes which comprises disposing one of the sets or scenes within range of a camera, masking a portion of said set or scene with a reflecting surface, producing on the reflecting surface within range of the camera an image of a second set or scene, and blending the meeting edges of the composite image formed in the camera by coordinating a light transmitting member along the periphery of the reflecting surface where the two images of the first and complementary sets or scenes are interfitted, arranging another reflecting surface across a portion of the light rays from one of the first mentioned sets or scenes and across the light rays fr m a third set or scene, while masking a portion of one of the first mentioned sets or scenes, forming an image of the third set or scene in the camera, the size and shape of the reflecting surfaces and the window in the transparent member being such that the images of the plurality of sets or scenes will be interfitted into a composite picture.

21. An arrangement for producing composite motion pictures comprising a plurality of sets or scenes, a camera, a transparent member having a reflecting surface thereon disposed between one of the sets or scenes and the camera, the reflecting surface covering only a portion of the transparent member and thereby providing a sight window through which the first mentioned set or scene may be photographed, the reflecting surface being disposed at an angle to the axis of the camera and relative to a second set or scene that an image of the second set or scene will be formed in the camera, a second reflecting surface disposed across the light cone of one of the sets or scenes and across the light rays from a third set or scene whereby an image of the third set or scene will be formed in the camera, the size and shape of the reflecting surfaces and the window in the transparent member being such that the images formed in the camera will be interfitted to provide a composite picture with the edges of the images being blended into each other.

22. The art of making composite motion pictures of a plurality of sets or scenes which comprises arranging a light transmitting member between the camera and one of the sets or scenes, masking a portion of the light transmitting member while providing for a reflecting surface on the masked portion of the first set or scene, the unmasked portion of the light transmitting member providing a sight window through which the first set or scene may be photographed, the light transmitting member being arranged at an angle to the axis of the camera and at an angle to the light rays from a second set or scene so that the second set or scene may be photographed by reflection, arranging other mirrors across the light rays of one of the first mentioned sets or scenes, each of the last mentioned mirrors being arranged at an angle to one of the other sets or scenes so that the other sets or scenes may be photographed by reflection, the size and shape of the reflecting surfaces and the sight window being such as to interfit and coordinate the images of the sets or scenes into a composite picture, and then simultaneously photographing the composite image.

23. A step in the art of making composite motion pictures of a plurality of sets or scenes which comprises arranging a mask having a sight window between the camera and a set or scene and in the unsharp zone of the light rays from the set or scene while at the same time providing for a blending edge on an image of said set or scene which is formed in the camera which edge is adapted to be merged into an adjacent edge of an image of another set or scene, said blending edge being free of any lines of demarcation, the size and shape of the window and mask being such that they will provide for the exact fitting of the image of the first mentioned set or scene with the image of a second set or scene.

EUGEN SCHÜFFTAN.